Patented Feb. 17, 1953

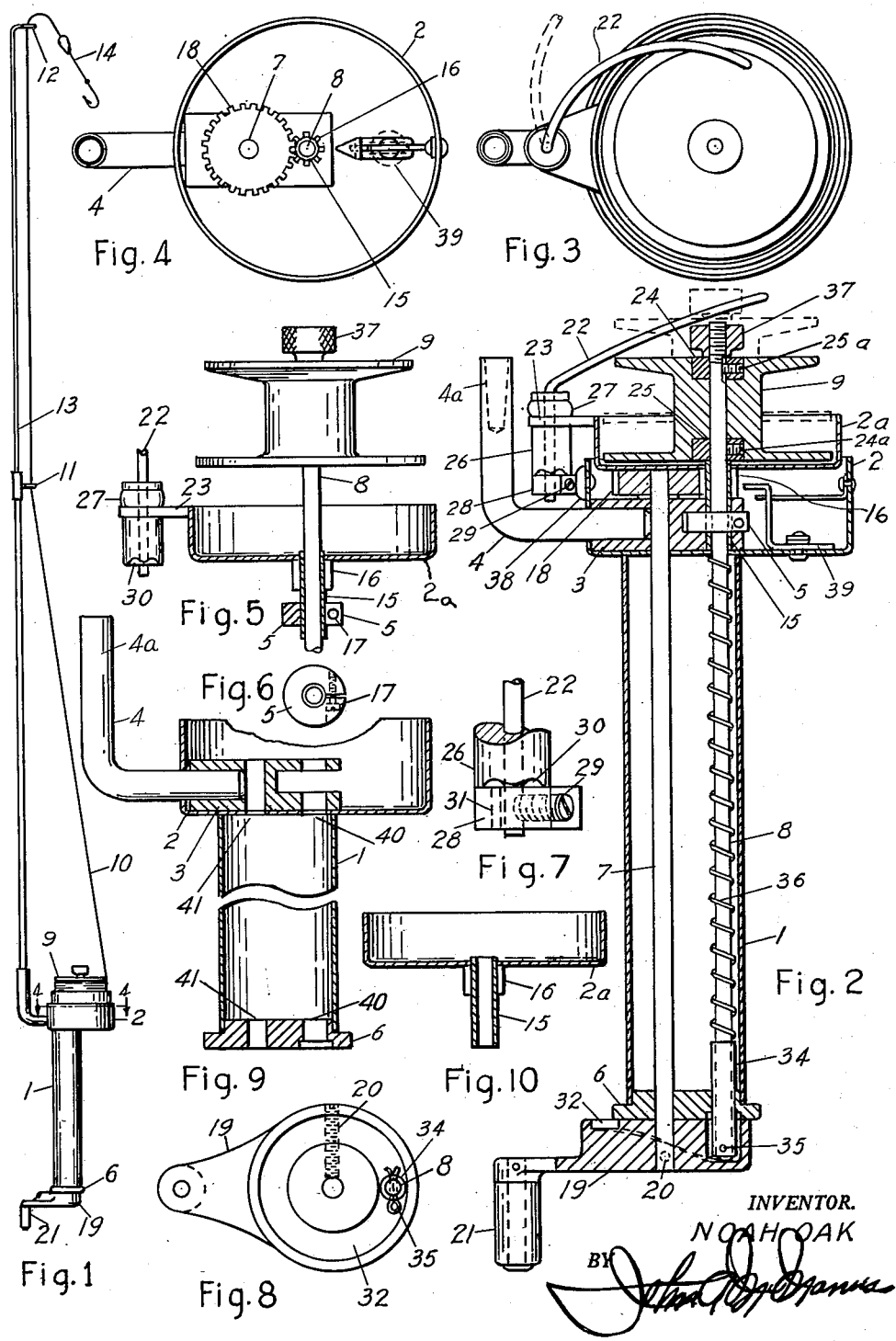

2,628,444

UNITED STATES PATENT OFFICE 2,628,444

FISHING ROD AND REEL

Noah Oak, Lynn, Mass., assignor of one-half to Clarence G. Hilton, Lynn, Mass.

Application October 23, 1950, Serial No. 191,535

7 Claims. (Cl. 43—20)

1

The present invention relates to improvements in fishing rod and reel, and in which the fish pole is preferably offset from the reel.

One of the objects of my invention is to combine a reel with a fishing pole, wherein the reel will be located in the top of an elongated handle for the fishing pole, and the said handle provided with a bracket adapted to receive the fishing pole in a position offset from the handle.

Another object of my invention is to provide a spinner type fishing reel and pole of the character described herein which is so designed as to be relatively inexpensive to manufacture as compared with other spinner type fishing reel devices now on the market.

Another object of my invention is to simplify the construction of a fishing pole and reel of the type envisioned in my invention and which shall be encompassed in small dimensions by providing a single pair of spur-driving gears therefor, thus eliminating the use of bevel or mitre gears which take up more room for their operation.

Still another object of my invention is to provide improved means cooperating with a crank at the bottom of the elongated handle adapted to cause reciprocation of a line spool at the top of the handle for level-winding the fish line onto the spool.

A further object of my invention is to provide a unit element comprised of parts all integrally united, and this unit is adapted to receive the remaining mechanism to complete the structure.

These and other features of my invention will be revealed in more detail by reference to the accompanying specification, drawing and claims.

In the drawing, Figure 1 is a side view of my improved fishing pole and reel, Fig. 2 is a cross-sectional view through the handle shown in Fig. 1; Fig. 3 is an end view of the reel itself showing the loading-arm in position to deposit the fish line on the reel spool; Fig. 4 is an end section on line 4—4 of Fig. 1; Fig. 5 is a view illustrating the arrangement of the loading-arm and sliding reel-spool together with the spindle for the latter; Fig. 6 is an end view of the thrust collar shown in Fig. 5; Fig. 7 is a view of the cam which determines the travel of the loading-arm over and off the spool and the bearing for said cam; Fig. 8 is a top view of the crank and cam for reciprocating the level-winding spool; Fig. 9 is a view of the elongated handle and parts integrally united therewith, and Fig. 10 is a sectional view of the loading-arm cup showing the assembly of the cup, sleeve and pinion thereon.

In further detailed designation of parts, 1

2 represents the elongated handle for the fish pole and reel to which handle is secured a cup 2 having a block 3 therein. The block 3 is provided with cut-away portions forming recesses adapted to receive a fish pole bracket 4 having a socket 4a therein, and a thrust collar 5, respectively. In the bottom of handle 1 is a second block 6, both the handle and the block 6 being, preferably, cylindrical in form, and the handle being hollow to receive two spindles 7 and 8, extending therethrough and through suitable openings in the blocks 3 and 6. Mounted on the top of spindle 8 is a reel-spool 9 adapted to have wound thereon a fish line 10 threaded through suitable guide-rings 11 and 12 carried by a fish pole 13 (Fig. 1), the line being provided with a fish-hook 14 at the end thereof. Suitably held in the block 3, by the thrust collar 5, is a sleeve 15 having a spur gear pinion 16 formed at the one end thereof. Preferably, the cup 2a, sleeve 15, and spur-gear pinion 16, are all integrally united as best shown in Fig. 10, wherein sleeve 15, extends slightly into cup 2a, and is welded or brazed therein. The clamp or thrust collar 5, shown in Figs. 5 and 6, is tightened by means of the clamp screw 17. On the top of spindle 7, and pinned or otherwise secured to the latter is a driving spur-gear 18 which meshes with spur-gear pinion 16. The bottom of spindle 7, is secured to the center of the disc-like portion of the crank 19 by suitable fastening means, such as the screw 20, in a manner to permit the spindle 7, to be turned by the crank handle 21.

Referring further to the construction and mounting of reel spool 9, this spool sets in cup 2a to which cup is attached a bracket 23, for supporting loading-arm 22. Spool 9 is secured to spindle 8 at the top thereof by means of a suitable sliding collar 24 and a stationary collar 25. These collars are locked to spindle 8 by locking screws 24a and 25a. The spool is adapted to normally rest on the top of sleeve 15, in order to afford frictional clearance from the inside bottom of cup 2a as said cup 2a rotates about the spindle 8 and the spool 9.

The detailed construction and mounting of the loading-arm is best illustrated in Fig. 7, wherein 22 represents the loading-arm itself and 26 the bearing therefor. The loading-arm is held tight in the bracket against rubber friction pad 27 (Fig. 2) by means of the rocker arm 28. The latter is locked by set-screw 29. A cam path 30 is provided in the bearing which contacts cam-path pin 31. The cam path 30, actuates the loading arm 22, to oscillate in a manner determined by the shape of the cam-path and to guide the line onto the winding spool. Such mechanisms for loading arm operations are well known in the art.

Referring to Fig. 8, which is a top view of the hand crank, a circular cam groove 32, is shown cut in the face of the disk-like portion of the crank 19. The position of the cam in the crank is also shown in Fig. 2. The lower end of spindle 8 of the winding or reel spool 9, rides on the cam 32. However, the lower end of spindle 8 is seated in sleeve 34 and both the sleeve and spindle are pinned together by suitable means such as by the cotter-pin 35, best shown in Fig. 8. A spiral spring 36 seated between top of sleeve 34 and bottom of cup 2 embraces spindle 8 in order to return the latter to its seat subsequent to the outward sliding motion of the spool caused by rotation of the cam. The cotter pin 35 will normally prevent the spindle 8 and spool 9 from rotating. Thus, when the handle 21 of crank 19 is rotated, it causes cam 32 to push spool 9 forward to the dotted line position (Fig. 2), and the spring 36 brings it back.

While normally spool 9 does not rotate and is actuated by the crank handle 21 to have a reciprocating motion only, there is a provision for a limited slippage of said spool. For example, a predetermined amount of friction on the spool may be established by means of a friction adjusting nut 37 on sliding collar 24. In case there is sufficient pull exerted by the fish on fish line 10 to overcome the friction set up by adjusting nut 37, the spool will be able to yield slightly to the extent of this extra pull on the line.

Mounted on the fixed cup 2 is a button 38. When the rocker arm 28 carried by the rotating reel cup 2a hits against button 38 on fixed cup 2, loading arm 22 is caused to pick up the fish line and to guide the latter onto the spool 9. The loading arm is shown in full lines at 22, Fig. 3, in this line depositing position. It will be noted that because of the bend given to cam path 30 on the bearing 26, the loading arm will not touch the spool and be interferred with in its line-loading function. The dotted lines, Fig. 3, illustrate the initial position of the loading arm when the fish line is being unwound from the reel.

The more or less conventional clicking device 39 is shown in Figs. 2 and 4, and requires no further explanation here, as such devices are well known in the art.

Referring now more specifically to Fig. 9, which shows a preferred form of my improved elongated handle and parts integrally united therewith, I represents the handle to which is spot-welded or otherwise integrally secured thereto, the stationary cup 2. To this cup is likewise integrally joined block 3, the fish-pole bracket 4 (having a socket 4a) being integrally united to block 3. At the bottom of the handle, block 6 is likewise integrally united to the handle. The method of resistance spot-welding, or the method of brazing such parts together are so well known that it is deemed unnecessary to detail them here. However, the blocks 3 and 6 having provided therein suitable bearing bores 40 and 41 for supporting spindles 7 and 8, it is a relatively easy matter to assemble the remaining parts supported in the integral unit formed as described. This construction is conducive to standardization of parts for quantity production.

The operation of my invention is as follows:

The parts being normally in the position shown in Fig. 1, when it is desired to cast, the casting operation is performed in the usual manner. However, when it is desired to wind in the line, the crank handle 21 is turned in the required direction, thus actuating spindle 7 to turn driving spur-gear 18. As spur gear 18 is in mesh with spur-gear pinion 16, this rotates cup 2a, and loading-arm 22, carried thereby. The fish line 10 is now picked up by loading-arm 22, and loaded onto winding-spool or reel spool 9. At the same time, the cam 32 causes sleeve 34, and spindle 8 therein to reciprocate the spool 9, and level-wind the fish line onto said spool. The spiral spring 36 on spool spindle 8 returns the spool to its inward position after each rotation of the crank.

What I claim as new and desire to secure by Letters Patent of the United States is:

1. In a fish rod and reel, an elongated fish rod handle, a crank at the bottom of said handle, a cam groove formed in one face of the crank, a spindle riding on the cam groove, a line winding-spool attached to the top of the spindle, said spool being normally non-rotatably and slidably mounted on the top of the handle, means comprising a loading-arm for winding the fish line onto the spool, a support for the loading-arm, a spur-gear pinion integrally united with the suport and rotatably mounted on the spindle, a second spindle having a spur-gear fixedly mounted on one end thereof and meshing with the pinion to rotate the support and loading-arm, a bearing block for the spindles, a cup integrally united with the bearing block and fixedly secured to the top of the elongated handle, a second bearing block for the spindles at the bottom of said handle, means for securing the second spindle in operative connection with the crank, a crank-handle for the crank, and an offset bracket on the elongated handle of the fish rod having a socket therein adapted to receive a fish rod.

2. In a fishing rod and reel, an elongated handle, a normally non-rotatable spool adapted to receive a fish line, said spool being mounted on the top of the handle, a crank at the bottom of the handle, a spindle attached at one end to the spool, said spindle having its other end seated in the crank, a spur gear pinion rotatably mounted on said spindle, means cooperating with the spindle and carried by the crank for reciprocating the spool, means for winding-in the fish line on the spool comprising a loading-arm and support therefor, a second spindle having a spur-gear fixedly mounted thereon and meshing with the spur-gear pinion to rotate the loading arm, a bearing for the spindles having a holding cup therefor said cup and bearing being attached to the handle, means for securing the second spindle in operative connection with the crank, and a bracket on the fish rod handle having a socket therein adapted to receive a fish pole.

3. In a fishing rod and reel, an elongated hollow handle, a normally non-rotatable spool adapted to receive a fish line, said spool being mounted in the top of the handle, a crank at the bottom of the handle, a spindle fixedly connected to the spool and slidably connected to the crank, a spur-gear pinion rotatably mounted on said spindle, a winding-in mechanism for winding-in the fish line on the spool, a second spindle, means for securing the lower end of the second spindle to the crank, a spur-gear on the upper end of the second spindle meshing with the spur-gear pinion for rotating the winding-in mechanism, suitable bearings for the spindles, means carried by the crank operatively engaging the spool spindle to move the same outward and means comprising a spring embracing the spool spindle to return the spool to its normal position subsequent to its outward travel of a reciprocating cycle.

4. A line reel and fishing rod comprising an elongated hollow handle having a reciprocating winding spool being normally non-rotatably and slidably mounted in the top thereof and a crank at the bottom of the handle comprising actuating means having a groove formed in one face thereof for operating the spool, a line loading mechanism cooperating with the spool, suitable gearing comprising a single pair of spur-gears operatively connecting the line loading mechanism, spool and crank, a spindle fixedly connected with the spool and adapted to ride in the groove, a spring suitably seated embracing said spindle and adapted to return the spool to its inward position subsequent to the outer travel of said spool, a crank-handle for operating the crank, a bracket integrally attached to the elongated hollow handle and offset therefrom, and a fish rod supported by and held in said bracket.

5. In a fishing rod and reel having an elongated hollow handle, a winding spool for the fish line mounted thereon, and mechanism for level-winding the line onto said spool, a crank and crank-handle therefor at the bottom of the elongated handle, a cam in operative relation with the crank, two spindles within the hollow handle, one of which is connected with the spool and which is actuated by the cam, a spur-gear pinion rotatably mounted on said one spindle, a second spindle connected with the crank and having a spur-gear thereon meshing with the pinion means driven by the spur gear and pinion and cooperatively engaging the level winding mechanism to actuate the latter, and means for returning the first spindle to its normal position subsequent to its outer travel actuated by the crank and cam.

6. In a fishing rod and reel having an elongated hollow handle, a winding spool and a leading arm for the fish line being mounted on the top of said handle and mechanism also carried by the handle for level-winding the line onto the spool including a crank and crank-handle therefor comprising connected means for operating the spool and loading-arm, a rotatable cup and bracket supported by the elongated handle, said loading-arm being mounted in the bracket, a bearing for the loading arm provided with a cam-path directing the travel of the loading-arm around the spool, a rocker arm supported by the loading-arm, means for securing the loading-arm in the loading-arm bearing, a fixed cup attached to the top of the elongated hollow handle, and a button on the outer surface of the fixed cup cooperating with the rocker arm to deflect the loading-arm from interference by the spool.

7. In combination with a fishing rod and support therefor, an elongated handle supporting a rotatable spindle and a line winding mechanism, a pair of spur-gears meshing with each other suitably mounted in the handle and adapted to rotate the line winding mechanism, one of the spur gears being fixedly mounted on the rotatable spindle, a crank at the bottom of the rotatable spindle and cooperatively connected thereto for operating the line winding mechanism, a second spindle also within the housing and adapted to be reciprocated in the elongated handle, a winding spool on the second spindle, a cam carried by the crank and cooperating with the second spindle to reciprocate the latter, and a crank handle for operating the crank.

NOAH OAK.

REFERENCES CITED

The following references are of record in the file of this patent:

UNITED STATES PATENTS

| Number | Name | Date |
| --- | --- | --- |
| 1,625,988 | Dice | Apr. 26, 1927 |
| 1,763,934 | Soltis | June 17, 1930 |
| 1,955,973 | Norton | Apr. 24, 1934 |
| 2,144,635 | Norton | Jan. 24, 1939 |
| 2,149,837 | Browne | Mar. 7, 1939 |
| 2,179,413 | Kolosso | Nov. 7, 1939 |
| 2,229,470 | Pezon | Jan. 21, 1941 |
| 2,299,156 | Lino | Oct. 20, 1942 |
| 2,433,197 | Carlson | Dec. 23, 1947 |
| 2,514,345 | Small | July 4, 1950 |